Dec. 1, 1970   N. F. LEMMON ET AL   3,544,133
QUICK COUPLER

Filed May 19, 1969   2 Sheets-Sheet 1

*INVENTORS*
N. F. LEMMON
G. D. WILLIAMS

Dec. 1, 1970   N. F. LEMMON ET AL   3,544,133
QUICK COUPLER
Filed May 19, 1969   2 Sheets-Sheet 2
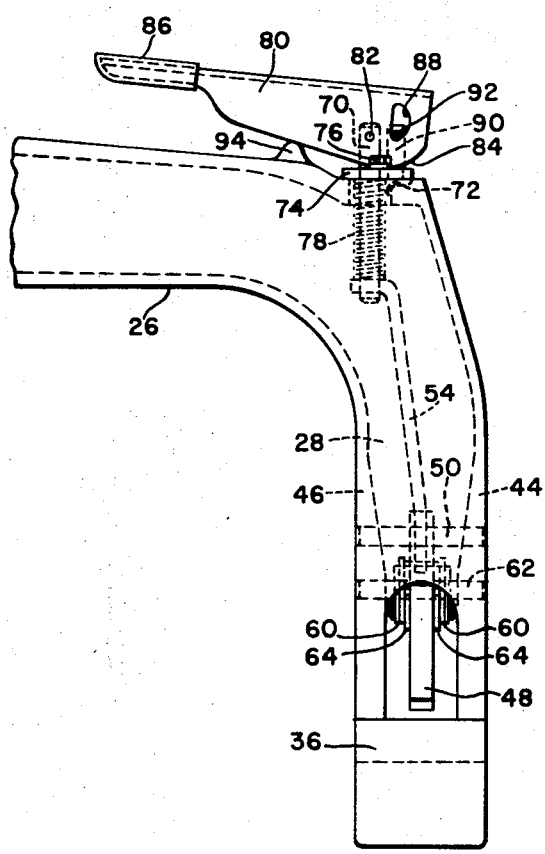
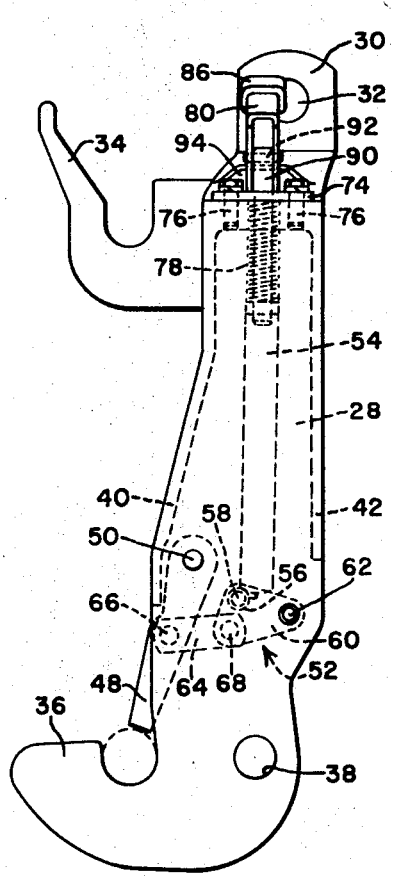
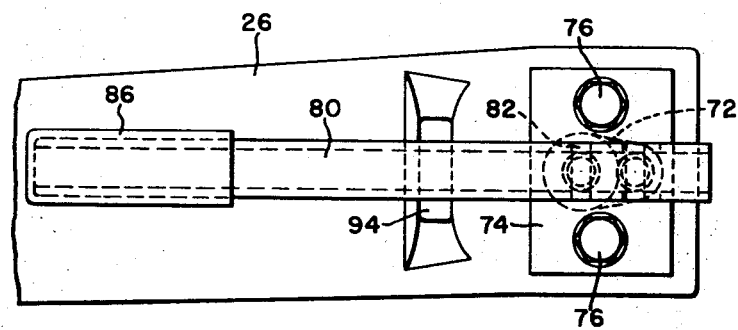
INVENTORS
N. F. LEMMON
G. D. WILLIAMS United States Patent Office 3,544,133
Patented Dec. 1, 1970

3,544,133
QUICK COUPLER
Norman Frederick Lemmon and Gerald Dennis Williams, Cedar Falls, Iowa, assignors to Deere & Company, Moline, Ill., a corporation of Delaware
Filed May 19, 1969, Ser. No. 825,645
Int. Cl. B62d 53/00
U.S. Cl. 280—479                                   5 Claims

ABSTRACT OF THE DISCLOSURE

A quick coupler in which the latching mechanism is normally spring biased closed and is movable to an open condition by a cam lever. When the lever is moved to a generally upright position, it opens the latching mechanism and when moved to a generally horizontal position in which it overlies the bight portion of the quick coupler, it permits the spring to close the latching mechanism. A pin and slot arrangement prevents the lever from moving to the horizontal position if the spring fails to close the latching mechanism.

BACKGROUND OF THE INVENTION

The present invention relates generally to a quick coupler for facilitating the attachment of mounted or semi-mounted implements to a tractor having a power-operated three-point hitch, and more particularly relates to an improved latch operating lever for a quick coupler.

Many of the commercially available quick couplers have latching mechanisms which are spring biased to the operative or locking position and are positively moved to an inoperative or open position by a lever which can be reached by a tractor operator without dismounting from the tractor. Since the latching mechanism is not positively moved to its locked position in response to movement of the lever, it is possible for the latching mechanism to become jammed in its open position without the operator being aware. It therefore becomes necessary to provide a means to give the operator an appropriate signal when the spring fails to return the latching mechanism to its locked position.

SUMMARY OF THE INVENTION

The object and general nature of this invention is the provision, in a quick coupler having latching means for the lower hooks which are spring biased to a locked position, of improved latch operating lever means which give the operator an indication of the failure of the spring to return the latch means to its locked position.

A more specific object of the present invention is to provide an improved operating lever for a latching mechanism which is normally spring biased closed, which lever will positively open the latching mechanism when moved to a first position, will permit the spring to close the latching mechanism when moved to a second position, but which cannot be moved to the second position if the spring fails to close the latching mechanism.

The above and additional objects of the present invention will become apparent to those skilled in the art from a reading of the following description when taken in conjunction with the accompanying drawings.

BRIEF DESCRIPTION OF THE DRAWINGS

In the drawings:

FIG. 3 is an enlarged rear view of an end portion of the coupler showing the latch and operating lever in further detail;

FIG. 4 is an end view of the coupler shown in FIG. 3;

FIG. 5 is a top plan view of the portion of the coupler shown in FIG. 3; and

DESCRIPTION OF THE PREFERRED EMBODIMENT

Figure 1:
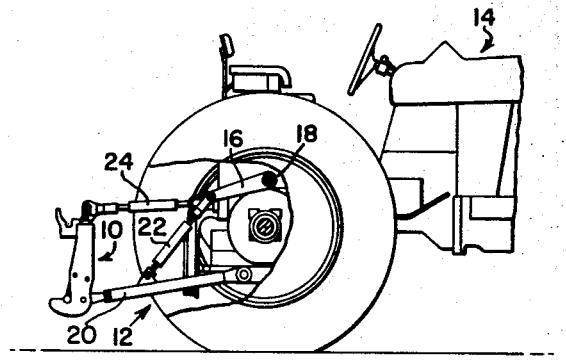
FIG. 1 is a side elevational view of the rear portion of a tractor provided with a quick coupler according to the present invention, parts of the tractor being broken away to illustrate the three-point hitch.
Figure 2:
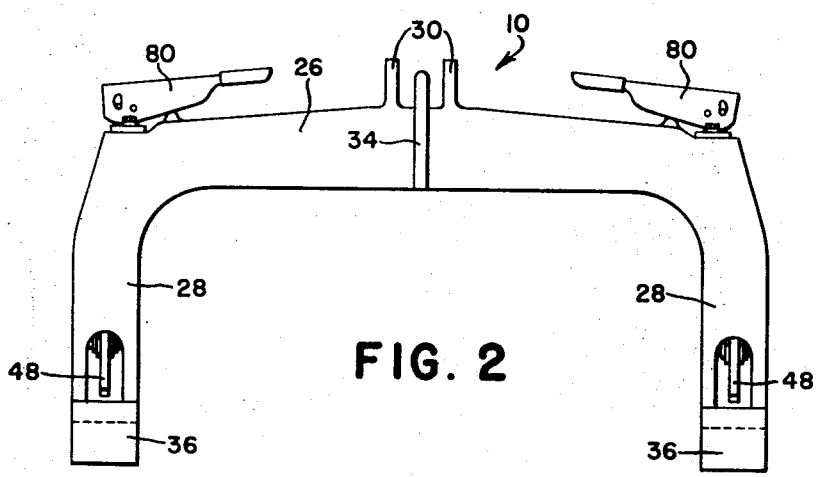
FIG. 2 is a rear elevational view of a coupler in which the improved latch operating lever of this invention has been incorporated.

With reference to the drawings, a quick coupler which is constructed in accordance with the principles of the present invention is indicated generally at 10 and is illustrated as being attached to the three-point hitch 12 of a conventional tractor 14. The three-point hitch 12 includes a pair of lift arms 16 which are secured to a rockshaft 18. The free ends of the lift arms 16 are secured to a pair of spaced lower draft links 20 by a pair of drop links 22. The upper ends of the drop links are pivotally connected to the lift arms 16 and the lower ends thereof are pivotally connected to the draft links 20. The forward ends of the draft links 20 are pivotally secured to the tractor while the rear ends thereof are pivotally connected to the quick coupler 10. The upper link 24 of the three-point hitch is pivotally secured at its forward end to the tractor and its rearward end is pivotally connected to the upper portion of the quick coupler 10.

The quick coupler comprises an inverted generally U-shaped member that includes a transverse bight portion 26 and a pair of depending legs 28. A pair of lugs 30 are secured to the central upper portion of the bight 26 to form a bracket to receive the rear end of the upper hitch link 24. The lugs 30 are apertured at 32 to receive a connecting pin which extends through the lugs 30 and an opening provided in the rear end of the upper hitch link 24. A rearwardly extending and upwardly open hook member 34 is also fixed to the central portion of the bight 26 and is adapted to receive the upper hitch pin of an associated implement.

The legs 28 depend from the outer ends of the bight 26 and are formed integrally therewith. The lower ends of the leg 28 are provided with upwardly open and rearwardly extending hooks 36 which are adapted to receive the lower hitch pins of the associated implement. The lower ends of the depending legs 28 are also apertured as at 38 to receive connecting pins, each of which extends through one leg and an opening provided in the rear end of one of the draft links 20.

Each of the legs 28 is generally of rectangular shape in cross section and has a rear side wall 40, a front side wall 42, and right and left side walls 44 and 46 respectively. A latch bar 48 is pivotally mounted between the side walls 44 and 46 by a pivot pin 50 which extends through aligned apertures in the side walls. The latch bar 48 will pivot about the pin 50 between an operative position in which the lower end of the latch bar 48 overlies the opening of the hook 36 as illustrated in FIG. 4 and an inoperative position in which the latch bar 48 is positioned wholly between the side walls 44 and 46. The movement of the latch bar 48 between the operative and inoperative positions is controlled by an overcenter or toggle linkage mechanism indicated generally at 52.

The linkage mechanism 52 includes a generally vertically extending latch rod 54 which has its lower end rigidly secured to a transversely apertured block 56 through which a pivot pin 58 is disposed. A pair of generally triangular-shaped links 60 are pivotally mounted at their apex on the ends of the pivot pin 58 and are also pivotally mounted to the side walls 44 and 46 by a pivot pin 62 which extends through the side walls 44 and 46 and through suitable apertures provided in the lower forward corner of the links 60. A second pair of links 64 are pivotally mounted at their rearward ends at opposite sides of the latch bar 48 intermediate the ends thereof by a pivot pin 66. The forward ends of the links 64 are pivotally connected to the lower rearward corners of the links 60 by a pivot pin 68.

The upper end of the latch rod 54 is secured in any suitable manner to the lower end of a rod 70 which extends upwardly through a suitable opening 72 provided in the upper surface of the bight 26 and through an aperture provided in a mounting block 74. The mounting block 74 is positioned over the aperture 72 and retained in position by a pair of cap screws 76. A compression spring 78 is positioned over the rod 70 and acts between the upper end of the latch rod 54 and the mounting block 74 to normally urge rod 70 and latch rod 54 downwardly.

The movements of the rod 70 and latch rod 54 are controlled by latch lever 80 which is pivotally mounted intermediate its ends to the upper end of the rod 70 by a pin 82. The lever 80 is channel-shaped and the pin 82 extends through suitable openings provided in the legs of the channel-shaped lever and an opening provided to the upper end of the rod 70 which is positioned between the legs of the channel-shaped lever. One end of the lever 80 is rounded as at 84 to provide a cam which cooperates with the upper surface of the mounting block 74 to move the rod 70 and latch rod 54 upwardly when the lever is pivoted in a clockwise direction as viewed in FIG. 3. The opposite end of the lever 80 is provided with a smooth covering 86 to provide a hand grip.

The legs of the channel-shaped latch lever 80 are also provided with bean-shaped slots 88 between the cam end thereof and the point of pivotal connection with the rod 70. The major dimension of the bean-shaped slot 88 extends generally transversely of the length of the lever 80. The mounting plate 74 carries an upstanding lug 90 which extends between the legs of the channel-shaped lever 80 adjacent the upper end of the rod 70 and the lug 90 in turn carries at its upper end a pin 92 which extends through the bean-shaped slots 88.

Figure 6:
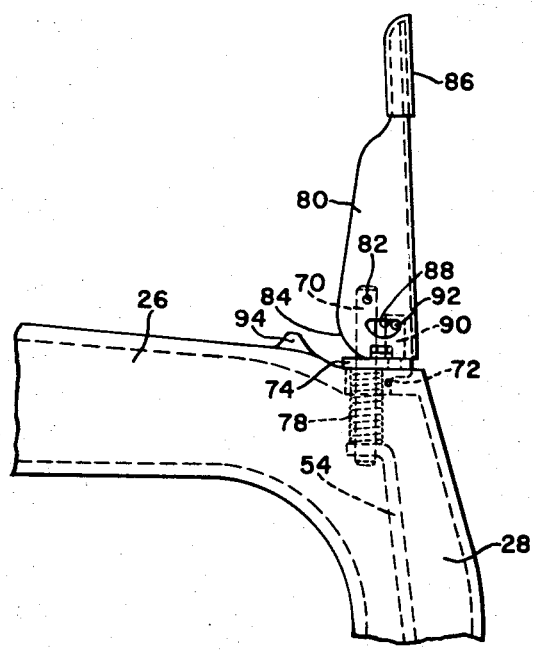
FIG. 6 is a fragmentary rear view showing the latch operating lever in the open position.

To connect or disconnect an implement from the coupler, the latch lever 80 must be pivoted clockwise from the position illustrated in FIG. 3 to the position illustrated in FIG. 6. As the lever 80 is moved from the FIG. 3 position to the FIG. 6 position the cam surface 84 acting against the upper surface of the mounting block 74 raises the rod 70 and latch rod 54 and compresses the spring 78. Upward movement of the latch rod 54 pivots the links 60 about the pin 62 causing upward and rearward movement of the pin 68 which in turn acts through the links 64 to the latch bar 48 to an inoperative position between the side walls 44 and 46. As the lever 80 moves to the position illustrated in FIG. 6, it leaves the cam surface 84 and rests upon a flat end surface so as to retain the rod 70 and latch rod 54 in their upper position and the latch bar 48 in its inoperative position. The latch bar 48 can again be moved to its operative position illustrated in FIG. 4 by pivoting the lever 80 in a counterclockwise direction from the position illustrated in FIG. 6 to a position illustrated in FIG. 3. As the lever 80 is pivoted counterclockwise as viewed in FIG. 6, the spring 78 will move the rod 70 and latch rod 54 downwardly until a lever 80 rests against an abutment 94 provided on the bight of the coupler frame.

If the implement hitch pins are not positioned entirely within the hooks 36, the latch bar 48 cannot be moved to its operative position since it would merely strike against the hitch pin. However, in such a case the spring 78 would not be able to move the rod 70 and latch rod 54 downwardly. If the spring 78 does not move the rod 70 downwardly upon counterclockwise movement of the lever 80, the movement of the lever 80 is halted by engagement of the outer edges of the bean-shaped slots 88 with the pin 92. Since the engagement between the edges of the slots 88 and the pin 92 prevents movement of the lever 80 to the operative position in FIG. 3, the operator would be immediately advised of the failure of the latch bar 48 to move to its operative position.

Once the latch bar 48 is in its operative position, undesirable movement thereof to the inoperative position is prevented by the overcenter linkage 52. Specifically, when a latch bar 48 is in its operative position the axis of the center pin 68 of the toggle linkage lies below a plane extending through the axes of the pins 62 and 66 of the toggle linkage and any forward movement of the latch bar 48 would tend to move the pin 68 downwardly. However, movement of the pin 68 downwardly is prevented by engagement of the lever 80 with the abutment 94.

While only a single preferred embodiment of the invention has been described and illustrated, it will be obvious to those skilled in the art that various modifications thereof can be made without departing from the underlying principles of the invention.

What is claimed is:

1. A quick coupler comprising: an inverted generally U-shaped member having a transverse bight and a pair of depending legs, hook means on the lower portion of each leg, latch means carried by each leg movable between operative hook closing positions and inoperative positions, vertically movable rod means extending along each leg and through the upper surface of the transverse bight, means associated with the lower end of each rod means to move the latch means between the operative and inoperative positions upon vertical movement of the rod means, lever means pivotally connected to the upper end of each rod means and movable between first and second positions, cam means on each lever means cooperable with the upper surface of the transverse bight to move the rod means upwardly upon movement of the lever means to the first positions, and means acting between each lever means and the U-shaped member preventing movement of the lever means to the second positions unless accompanied by downward movement of the rod means.

2. The quick coupler set forth in claim 1 wherein each of the lever means is pivotaly mounted intermediate its ends to associated rod means, the cam means is provided at the juncture of one end and a side of each lever means, and the means preventing movement of the lever means to the second positions includes slot means provided in each lever between the one end and the point of pivotal attachment with the rod means, an upright support means on the upper surface of the transverse bight adjacent the upper end of each rod means and a substantially horizontally extending pin means carried by the upper end of each support means and extending through the slot means provided in the associated lever means.

3. The quick coupler set forth in claim 2 wherein spring means bias each rod means downwardly and each of the slot means is elongated and has an arcuate side edge, whereby upon movement of each lever means to an upright position the cam means acts upon the upper surface of the transverse bight to raise the rod means, upon movement of each lever means to a substantially horizontal position the cam means permits the spring means to lower the rod means, and if the spring means fails to lower the rod means upon movement of the lever means toward the horizontal position the arcuate side edge of the slot means engages the pin means and prevents movement of the lever means to the horizontal position.

4. The quick coupler set forth in claim 1 wherein spring means bias each of the rod means downwardly, the means associated with the lower ends of the rod means move the latch means to the operative positions upon downward movement of the rod means, each lever means is pivotally mounted intermediate its ends to the upper end of the associated rod means, the cam means is provided at the juncture of one end and a side of each lever means, each of the lever means extends generally verticallly when in the first position and generally horizontally in a position overlying the transverse bight when in the second position, and the means preventing movement of the lever means to the second position includes a bean-shaped slot provided in each lever means between the one end and the point of pivotal attachment to the rod means, an upright support means on the upper surface of the transverse bight adjacent the upper end of each rod means, and a generally horizontally extending pin means carried on the upper end of each supporting means and extending through the slot in the associated lever, one side edge of each slot being movable along the pin means as the lever means is moved between its first and second positions and preventing movement of the cam means away from the upper surface of the transverse bight, whereby, upon failure of the spring means to move the latch means to the operative position upon movement of the lever means toward the second position, the side edge of the slot will engage the pin means and prevent movement of the lever to the second position.

5. The quick coupler set forth in claim 4 wherein the major dimension of the bean-shaped slot extends generally vertically when the lever means is in the second position and the pin means is positioned at the lowermost end of the slot, and when the lever means is in the first position the major dimension of the slot extends generally horizontally and the pin means is positioned at the opposite end of the slot.

References Cited

UNITED STATES PATENTS

| | | | |
|---|---|---|---|
| 3,048,228 | 8/1962 | Hess et al. | 172—272 |
| 3,172,686 | 3/1965 | Beard | 280—461 |
| 3,195,651 | 7/1965 | Todd | 172—272 |
| 3,498,638 | 3/1970 | Magruder | 280—479 |

LEO FRIAGLIA, Primary Examiner

U.S. Cl. X.R.

172—272; 280—461